Figure 3:
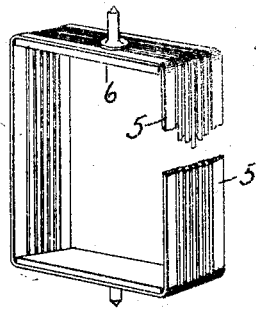

C. McCLAIR.
ELECTRICAL MEASURING INSTRUMENT.
APPLICATION FILED JAN. 21, 1909.

1,022,795. Patented Apr. 9, 1912.

Witnesses:
Lloyd C. Bush
Helen Orford

Inventor:
Charles McClair,
By Albert G. Davis
Atty.

UNITED STATES PATENT OFFICE.

CHARLES McCLAIR, OF SCHENECTADY, NEW YORK, ASSIGNOR TO GENERAL ELECTRIC COMPANY, A CORPORATION OF NEW YORK.

ELECTRICAL MEASURING INSTRUMENT.

1,022,795.

Specification of Letters Patent.

Patented Apr. 9, 1912.

Application filed January 21, 1909. Serial No. 473,527.

*To all whom it may concern:*

Be it known that I, CHARLES McCLAIR, a citizen of the United States, residing at Schenectady, county of Schenectady, State of New York, have invented certain new and useful Improvements in Electrical Measuring Instruments, of which the following is a specification.

My invention relates to electrical measuring instruments having a moving coil and more particularly to instruments in which the magnetic field is produced by means of permanent magnets, and its object is to produce an instrument having a field of great intensity in which the current carrying conductors are disposed most advantageously to secure a maximum torque on the moving system.

In measuring instruments of the moving coil type the magnetic field is obtained in a narrow air gap between the pole pieces of a magnet, and since the magnets are usually nearly saturated the only way to strengthen the field is to decrease the width of the air gap. The moving coil, which is mounted to extend through the air gap and cut the lines of force, is usually formed by winding the conductors upon a thin sheet metal shell or support. In the attempt to strengthen the magnetic field by decreasing the air gap, the thickness of the metal in the shell has been reduced to the minimum which will maintain the shape of the moving coil, but under the most favorable conditions the width of the air gap must be equal to the thickness of one conductor, and the thickness of the metal shell plus whatever mechanical clearance may be necessary to enable the moving coil to swing freely between the pole pieces.

In carrying out my invention no part of the shell or support extends into the air gap in which the magnetic field exists, and the conductors lying side by side in the air gap are either cemented to each other to form a rigid structure or are preferably tense, being supported in the air gap by being strung on the support under sufficient tension to keep them straight and in definite relation to the pole pieces. The current carrying conductor is the only part of the moving system which extends through the air gap and the width of the air gap can be reduced by the thickness of the shell or support heretofore used, since the width need only be equal to the thickness of one conductor plus the mechanical clearance between the conductor and the pole pieces.

My invention will best be understood in connection with the accompanying drawings, which show one of the many forms in which it may be embodied, and in which—

Figure 4:
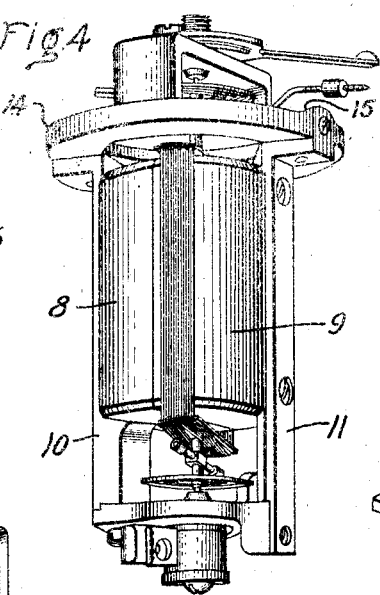
Figure 1:
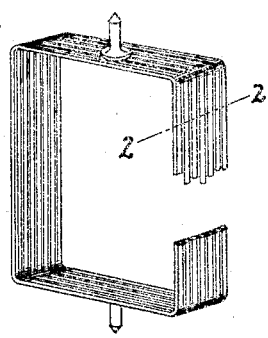
Figure 7:
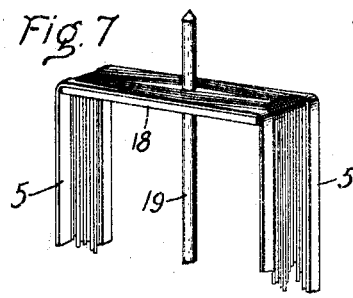
Figure 5:
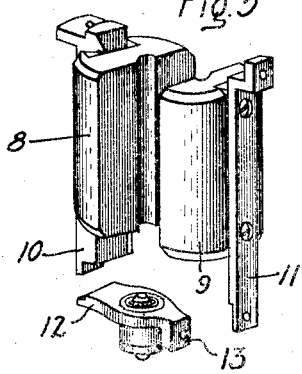
Figure 6:
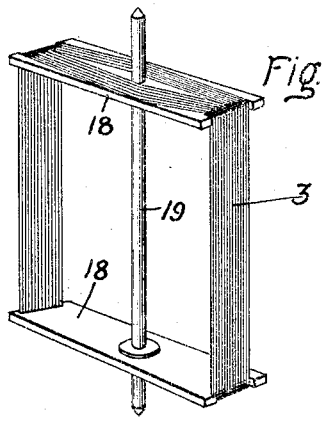
Figure 2:

Figure 1 is a view in perspective of a coil constructed in accordance with my invention, part of the coil being broken away; Fig. 2 a section along the line 2—2 of Fig. 1, showing the relation of the conductors and the cement by which they are held; Fig. 3 a perspective view of a coil constructed as shown in Fig. 1 with damping strips on each edge of the coil; Fig. 4 a view in perspective of a moving system and its support with the conductor strung under tension; Fig. 5 an exploded view showing the two halves of the split core shown in Fig. 4; Fig. 6 a view in perspective of one form of moving coil adapted for use with the construction shown in Fig. 4; Fig. 7 a modified form of moving coil showing damping strips; and Fig. 8 a cross section through the pole pieces of an instrument having a moving system constructed as shown in Fig. 4, with a moving coil constructed as best shown in Fig. 6.

Figure 8:
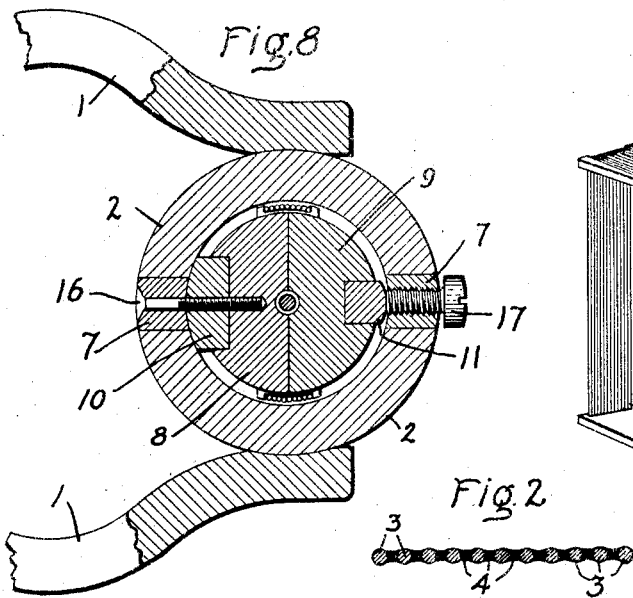

In a well known type of measuring instrument, to which the specific embodiment of the invention shown in the drawings is well adapted, the magnetic field is produced, as shown in Fig. 8 by means of a magnet 1 provided with semi-circular or concave polepieces 2 confronting each other, and a solid cylindrical core, instead of the split core shown in Fig. 8, is mounted concentric with the pole pieces to form an annular magnetic field. The magnet 1 is usually a permanent magnet and the air gap between the pole pieces and the core should be as narrow as possible to secure a very intense magnetic field.

In accordance with my invention, the moving coil is made in the form of a rectangle comprising conductors 3 laid side by side with spaces between them, as shown in Fig. 2, and held in proper relation to each other by any suitable cement 4, preferably an insulating cement such as shellac, which fills the spaces between the conductors but does not project beyond them, thereby insulating the conductors 3 from each other and permitting the thickness of the coil to be reduced to the diameter of a bare conductor, since the necessary mechanical clearance between the bare conductor and the pole piece gives an air gap of sufficient dielectric strength to prevent leakage of current from the conductor to the pole piece. Since an increase in width of the coil does not cause an increase in the width of the air gap between the pole pieces and the core, the conductors are spaced far enough apart to permit the layer of cement between the conductors to be of the same thickness as the conductors and wide enough to give the whole coil the required rigidity and strength so the cement does not project beyond the conductors and does not increase the thickness of the coil. If desired, the coil may be made stronger by completely covering the conductors with cement, in which case the thickness of the coil is increased, due to the coating of cement on the conductors, but even then the coil is no thicker than the conductor ordinarily used and covered with silk or similar insulation. The pivots for the coil are cemented on in the usual manner.

The coil may be damped either by short circuiting some of the conductors or preferably by mounting on the edge of the coil damping strips of the same thickness as the coil, as shown in Fig. 3 in which a shell of sheet metal the same thickness as the coil is formed into a rectangle and the sides are cut to leave damping strips 5, between which the conductors of the coil are placed. Strengthening strips 6 are mounted at the ends of the coil, and the whole structure is cemented together by placing cement between the conductors, as shown in Fig. 2, and also between the conductors and the damping strip.

In the specific form shown in Fig. 8 the pole pieces 2 of the magnet have their adjacent ends connected by space blocks 7 of brass or other non-magnetic material, preferably welded to the ends of the pole pieces to make the entire pole piece structure substantially one block of metal. A circular magnetic field of great intensity is secured by mounting a cylindrical iron core concentric with the pole pieces 2 to leave a narrow air gap between the core and the faces of the pole pieces. As shown in Figs. 5 and 8, the core is preferably split into two parts 8 and 9 along a plane at right angles to the plane of the space blocks 7 and is bored out along its axis to receive the shaft of the moving system. The two parts of the core may be held in engagement with each other and the core may be positioned concentric with the pole pieces in any suitable way, the preferred construction being shown in the drawing, in which one part 8 of the core is provided with a spacing rib 10 which, as shown in Fig. 8, is preferably wide enough to span the space block 7 and is shaped to fit snugly against the faces of the pole pieces 2. Since the spacing rib 10 projects from the core a distance equal to the width of the air gap between the core and the pole pieces, the core is rigidly positioned truly concentric with the pole pieces when the spacing rib by any suitable means is forced into firm engagement with the faces of the pole pieces 2. The other part 9 of the core is provided with a guide rib 11 which projects from the core diametrically opposite the spacing rib 10 and assists in maintaining the core concentric with the pole pieces while the core is being put into position between the pole pieces. The two ribs on the core are joined at the bottom by means of a bottom cross bar 12 attached at one end to the spacing rib 10 and having on the other end a lug 13 to receive a stud which passes through the lower end of the guide rib 11 at right angles to the rib and is threaded into the lug 13 thereby drawing the ribs 10 and 11 and the parts of the core 8 and 9 toward each other. The upper ends of the ribs are held in proper relation to each other by means of a top yoke 14 made in the form of a ring and provided on one side with a lug 15 recessed to receive the upper end of the guide rib 11. The spacing rib 10 is attached to the top yoke 14 at a point diametrically opposite the lug 15 and the upper end of the spacing rib 11 is secured to the top yoke by a stud which draws the upper end of the guide rib 11 toward the spacing rib 10. The two parts 8 and 9 of the core are firmly held in engagement with each other when the moving system is assembled, and as is apparent from Figs. 4 and 8, the entire moving system forms a cylindrical plug which can be slid into position between the pole pieces 2 without damage to the moving coil.

After the moving system has been placed in position between the pole pieces, the core is fixed in definite relation to the pole pieces by forcing the spacing rib 10 into firm engagement with the faces of the pole pieces 2 by any suitable device, such as a holding screw 16, which, as shown in Fig. 8, extends through one of the space blocks 7 and the spacing rib 10 into the part 8 of the core, and also by some clamping device which engages the other part 9 of the core and exerts along a line passing through the spacing rib a pressure tending to force the part 9 of the core toward the part 8, thereby clamping the two parts of the core to each other with the spacing rib held in firm engagement with the pole pieces. Any suitable clamping device may be used for exerting the pressure in the proper direction on the part 9 of the core, but the preferred construction, as shown in Fig. 8, comprises a clamping screw 17 threaded into the space block 7 in a position to engage the guide rib 11 and exert pressure along a line passing through the axis of the core and through the spacing rib 10 thereby tending to force the two parts of the core into engagement and to force the spacing rib 10 against the faces of the pole pieces 2.

With the construction above described, it is possible to secure a very narrow air gap and therefore a very intense field, and also to position the core truly concentric with the pole pieces. In accordance with my invention the moving system is so constructed that only the current carrying conductors extend through the narrow air gap between the core and the pole pieces 2, hence all the available width of the gap is occupied by metal which carries current and assists in developing torque. In the usual construction the field would be much weaker with the same thickeness of conductors, as the air gap would have to be wider because part of the width of the gap is occupied by the shell or support for the conductors. The conductors are maintained in position in the field by being held tense on any suitable conductor support which is formed to permit them to extend through the air gap and to move in a direction to cut the lines of force.

In the specific form of instrument shown in the drawings any form of support may be used which is mounted to rotate about the axis of the core and is bow shaped to bring its ends into alinement with the magnetic field in the air gap between the pole pieces 2 and the core in such a manner that the conductors can be strung under tension between the ends of the support and through the air gap without any part of the support extending between the core and pole pieces and thereby requiring the gap to be wider than the conductors plus mechanical clearance. The preferred form of support for the conductors comprises cross arms 18 mounted at opposite ends of the core, as shown in Fig. 6, with their ends in alinement with the air gap, and supported on a shaft 19 which extends axially through the core but is not in contact with it. The shaft is mounted in bearings of the usual type carried on the cross bar 12 and on the top yoke 14, while the conductors 3, as best shown in Fig. 6, are wound on the cross arms under sufficient tension to keep that portion of the conductor between the ends of the cross arms tense and straight, even if the cement 4 is omitted. The cross arms extend away from the shaft 19 and form with the shaft a support having each side in the shape of a bow with its ends in alinement with the air gap or circular field of force. In order to secure a sufficient torque on the moving system a plurality of current carrying conductors are used and are so connected that the current flows in the same direction in all the adjacent conductors extending through the same part of the magnetic field, so that all the adjacent conductors tend to move through the air gap in the same direction. In the specific arrangement shown, the conductors on opposite sides of the support coöperate to rotate the moving system about the shaft 19 as a center, as all the conductors on each side tend to move as a unit. If desired the conductors can be spaced and the spaces filled with cement in the manner shown in Fig. 2, and the coil thereby stiffened without increasing its thickness.

It is desirable to provide some means for damping the moving system in an instrument of this type and in accordance with my invention the moving system is provided with short circuited damping conductors mounted side by side with the current carrying conductor, whereby the width of the air gap is not increased by the presence of the damping conductors. The damping conductors may be short circuited conductors similar to the current carrying conductors, but are preferably made of very thin metal sheets, as shown in Fig. 7, strung between the ends of the cross arms 18 under tension and extending through the magnetic field on each side of the current carrying conductors. The damping conductors occupy the same width of air gap as the current carrying conductors, but have no part in supporting the current conductors and are kept straight and in position by being strung under tension. The damping conductor may conveniently be made, as shown in Fig. 7, of very thin sheet metal in the form of a rectangular shell which is not self-sustaining but is held tense by the cross arms 18 and has a strip cut out of each side between the cross arms, thereby leaving in each field two damping strips 5 with a space between them in which the current carrying conductors are strung in alinement with the two damping strips.

My invention may be embodied in various other forms and I therefore do not desire to be restricted to the specific form and arrangement shown in the drawings, but intend to cover by the appended claims all changes and modifications within the spirit and scope of my invention.

What I claim as new, and desire to secure by Letters Patent of the United States, is,—

1. In an electrical measuring instrument, the combination with a magnet having two pole pieces, of a magnetic member mounted adjacent said pole pieces to coöperate therewith and produce a magnetic field, said member being split into two parts and having a space block between one of said parts and said pole pieces, and clamping means coöperating with said pole pieces to force both parts of said member into firm engagement with each other and with said pole pieces and thereby firmly position the parts of said member in definite relation to each other and to said pole pieces.

2. In an electrical measuring instrument, the combination with a magnet having a pole piece, of a coöperating magnetic member mounted adjacent said pole piece to produce a magnetic field, said member being split into two parts and having a spacing rib between one of said parts and said pole piece, and clamping means coöperating with said pole piece to force the other part of said member toward said pole piece, thereby firmly clamping the parts of said member to each other and to said pole piece.

3. In an electrical measuring instrument, the combination with a magnet having pole pieces, of a core mounted between said pole pieces and split into two parts with a spacing rib between one of said parts and said pole pieces to space said core from the pole pieces, and clamping means whereby pressure is applied to the other part of said core in line with the spacing rib to clamp the parts of said core to each other and to the pole pieces.

4. In an electrical measuring instrument, the combination with a magnet having confronting concave pole pieces with a gap in the magnetic circuit of said pole pieces between the adjacent ends of said pole pieces, of a cylindrical core mounted concentric with said pole pieces and split into two parts along a plane at right angles to said gap, one of said parts having a spacing rib wider than said gap and in engagement with both pole pieces, and means coöperating with said pole pieces and the other part of said core to wedge both parts of said core together in fixed relation to said pole pieces.

5. In an electrical measuring instrument, the combination with a magnet having confronting concave pole pieces with their adjacent ends secured to space blocks of nonmagnetic material, of a cylindrical core mounted concentric with said pole pieces and split into two parts along a plane at right angles to the plane of said space blocks, one of said parts having a spacing rib wider than said space blocks and positioned to span one space block, and a set screw threaded into the other space block to engage the other part of said core and thereby wedge the core in position.

6. A coil for measuring instruments comprising a plurality of conductors mounted side by side with spaces between them and equidistant from the axis of rotation of said coil, and cement in the spaces to bind the conductors together, said cement being of substantially the same thickness as said conductors.

7. A coil for measuring instruments comprising a plurality of conductors mounted side by side and equidistant from the axis of rotation of said coil with a space between adjacent conductors, a damping strip mounted at the same distance from the axis of rotation with its edge adjacent the outermost conductor and separated therefrom by a space, and cement in all said spaces to bind said conductors and said damping strip together, said cement being of substantially the same thickness as said conductors.

In witness whereof, I have hereunto set my hand this 20th day of January, 1909.

CHARLES McCLAIR.

Witnesses:
BENJAMIN B. HULL,
HELEN ORFORD.